United States Patent
Schulz

(10) Patent No.: US 7,866,876 B2
(45) Date of Patent: Jan. 11, 2011

(54) DEVICE FOR DEGASSING AND FILTERING PLASTIC MELTS

(75) Inventor: Helmuth Schulz, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 46 days.

(21) Appl. No.: 12/298,248

(22) PCT Filed: Apr. 24, 2007

(86) PCT No.: PCT/AT2007/000185
§ 371 (c)(1),
(2), (4) Date: May 29, 2009

(87) PCT Pub. No.: WO2007/124519
PCT Pub. Date: Nov. 8, 2007

(65) Prior Publication Data
US 2010/0034917 A1 Feb. 11, 2010

(30) Foreign Application Priority Data
Apr. 27, 2006 (AT) ............................. A 713/2006

(51) Int. Cl.
*A21C 1/10* (2006.01)
(52) U.S. Cl. ..................... 366/75; 366/79; 366/87; 366/88; 366/90; 425/203; 425/204; 425/208; 425/209; 96/216; 96/217
(58) Field of Classification Search ............... 96/216, 96/217; 425/203, 204, 28, 209; 366/75, 366/79, 87, 88, 90
See application file for complete search history.

(56) References Cited

U.S. PATENT DOCUMENTS

| RE23,880 E | * | 9/1954 | Heston ......................... 366/80 |
| 3,874,090 A | | 4/1975 | McCracken |
| 4,959,186 A | * | 9/1990 | Dollhopf et al. ............. 264/102 |
| 5,141,426 A | * | 8/1992 | Capelle ...................... 425/203 |
| 5,419,634 A | * | 5/1995 | Bacher et al. ................. 366/75 |
| 5,651,944 A | * | 7/1997 | Schulz et al. ............... 422/137 |

(Continued)

FOREIGN PATENT DOCUMENTS

| DE | 11 74 054 B | 7/1964 |
| DE | 15 02 335 A1 | 2/1969 |
| GB | 1 171 590 A | 11/1969 |

Primary Examiner—Tony G Soohoo
Assistant Examiner—Dung Bui
(74) Attorney, Agent, or Firm—Townsend and Townsend and Crew, LLP

(57) ABSTRACT

The invention relates to a device for the extrusion of thermoplastic synthetic material featuring an extruder screw (2) which is mounted on a housing (1) including a plasticizing section (P) at the inlet side, a degassing section which is mounted upstream on a discharge section (A) and a conveying outlet (3) operating in the opposite direction which is located between the plasticizing section (P) and the degassing section (E). A flow channel (5) that contains a melt filter (4) is bridged over by at least one of the conveying outlets (3) in the opposite direction. To create favorable production conditions, the extruder screw (2) forms a similar conveying outlet (7) operating in the same direction between the conveying outlet (3) in the opposite direction and the downstream port (6) of the flow channel (5). The housing (1) has at least one degassing vent (8) at the transition area of the conveying outlet (3) operating in the opposite direction and the conveying outlet (7) operating in the same direction.

5 Claims, 1 Drawing Sheet

U.S. PATENT DOCUMENTS

| | | | |
|---|---|---|---|
| 6,129,873 A * | 10/2000 | Shelby et al. | 264/102 |
| 6,328,919 B1 * | 12/2001 | Pham et al. | 264/177.1 |
| 6,406,174 B2 * | 6/2002 | Bacher et al. | 366/82 |
| 2006/0103045 A1 * | 5/2006 | O'Brien-Bernini et al. | 264/45.9 |
| 2006/0146642 A1 * | 7/2006 | Peters et al. | 366/89 |
| 2007/0066797 A1 * | 3/2007 | Ohmi et al. | 528/499 |

\* cited by examiner

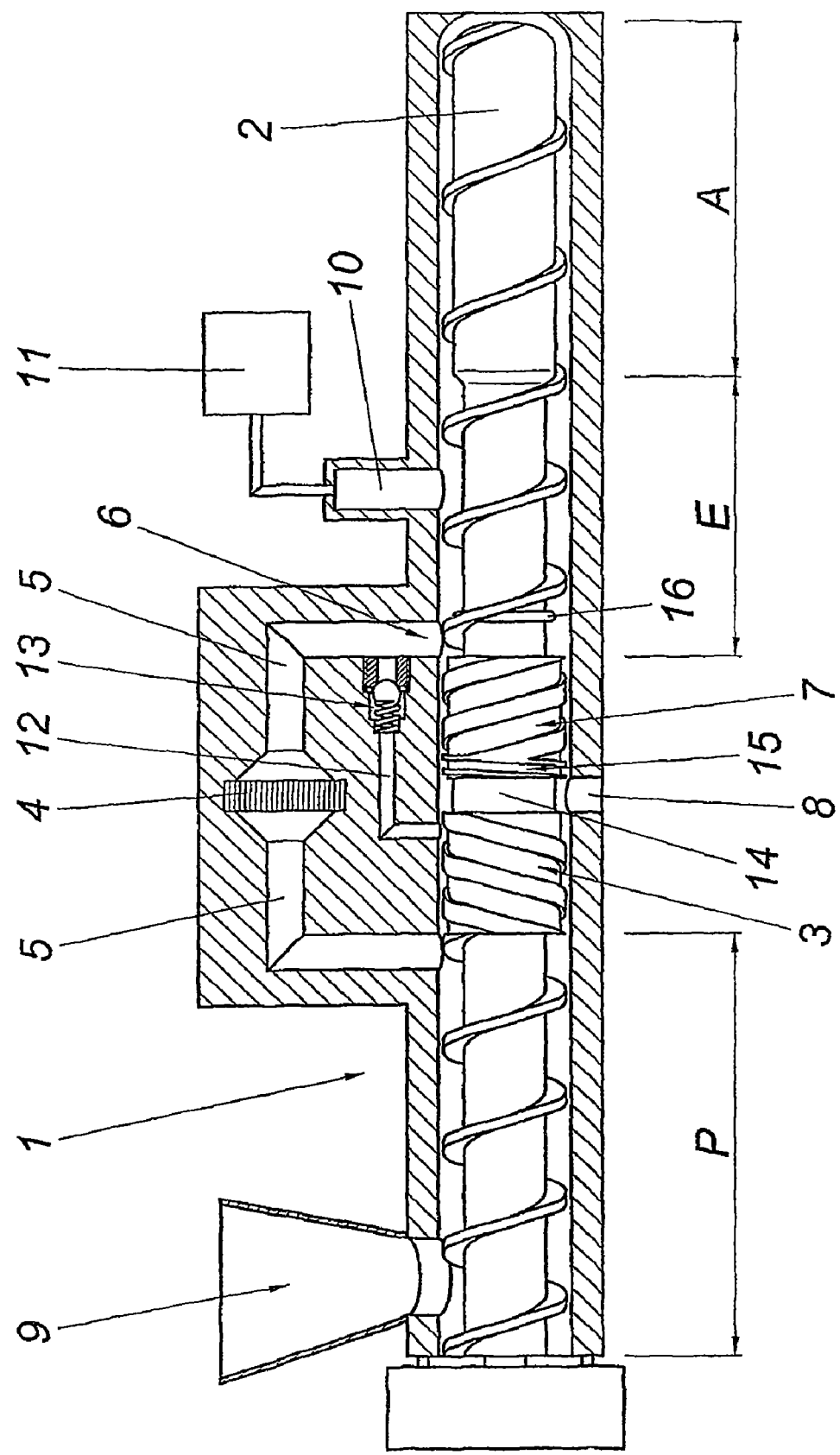

DEVICE FOR DEGASSING AND FILTERING PLASTIC MELTS

CROSS-REFERENCES TO RELATED APPLICATIONS

This application claims the priorities of Austrian Patent Application No. A713/2006 filed Apr. 27, 2006 and of PCT Application No. PCT/AT/2007/000185 filed Apr. 24, 2007, the disclosures of which are incorporated herein by reference.

TECHNICAL FIELD

The invention concerns a device for extruding thermoplastic synthetic products with an extruder screw mounted in a housing. The screw has a plasticizing section on the feed side thereof, a degassing section positioned upstream, that is, in front of a discharge section thereof, and an oppositely operating feed screw flight between the plasticizing section and the degassing section. The device further has at least one flow channel that bridges over the oppositely operating feed screw flight and has a melt filter.

STATE OF THE ART

Plastics, especially plastic wastes, which must be degassed and/or cleaned before being further processed, need to be expediently degassed and processed. Printing, painting or soiling of waste and/or used plastics requires that the plastics be cleaned before further use.

It is known (from WO 93/04841 A1) to melt plastic being reprocessed in an extruder, force it through a filter and degas it before further processing or granulation. To avoid an overflow of molten plastic from the plasticizing section to the degassing or discharge section, and to guarantee that all the molten plastic passes through the melt filter, an oppositely operating feed screw flight is arranged between the plasticizing section and the degassing section in the form of a feeding thread or sealing thread. The thread has a direction opposite to that of the screw thread of the plasticizing section, degassing section and discharge section. This known reverse feeding thread causes the return of a small fraction of the plastic that already passed through and had been cleaned by the melt filter back to the plasticizing section. This is supposed to prevent uncleaned plastic product from directly reaching the degassing and discharge section by bypassing the melt filter. The openings of the flow channel with the melt filter at the inlet and outlet sides are arranged right next to the reverse feeding thread to avoid dead spaces. This is supposed to prevent extended dwell times for the plastic product in the device which could cause heat damage to the plastic. A particular drawback of this device is that the feed screw sections with oppositely directed threads are in the nature of dynamic seals the tightness of which depends on the speed of the extruder screw. The viscosity of the plastic is also very important in this case, since plastic containing moisture forms vapors, and it cannot be prevented that moisture flows from the plasticizing section into the degassing section along these feed screw sections. Such vapors pass the filter and, amongst others, carry contaminants into the degassing section where they can again contaminate already filtered plastic, so that degassed and cleaned plastic of a uniform quality cannot be guaranteed. In addition, excessive degassing, caused for example by the moisture in the plastic, can cause undesirable pressure fluctuations in the device.

PRESENTATION OF THE INVENTION

In view of this prior art, it is an objective of the invention to overcome the aforementioned drawbacks and provide a device with improved degassing capability that prevents a direct material and/or gas flow from the plasticizing section into the degassing section via the feed screw flights between the sections.

This is attained with an extruder screw that has a feed screw flight which operates in the same direction as the screw and is located between an oppositely operating feed screw flight and an opening of a flow channel for the plastic on an outlet side of the screw. The transitional zone between the two feed screw flights includes at least one degassing opening.

The invention is based on the insight that gas overflows between the plasticizing section and the degassing section must strictly be prevented for producing qualitatively uniform, cleaned and degassed plastic. This is achieved in accordance with the invention, in that, on the one hand, material flow from the plasticizing section to the degassing section is prevented by the oppositely operating feed screw flight. Likewise, the flow of already cleaned plastic from the degassing section to the plasticizing section is prevented by the feed screw flight that operates in the same direction and that is arranged between the oppositely operating feed screw flight and the opening of the flow channel to the outlet section of the screw. This separates the two sections and permits a degassing opening, a monitorable outlet opening, and/or a reduced pressure space to be arranged between the two screw sections.

Gases and dirt particles entering the oppositely operating feed screw flight from the plasticizing section are therefore prevented in a simple manner from directly flowing into the degassing section and can be discharged from the device. This degassing and discharge can be deliberately supported in the usual manner by connecting the degassing space to a vacuum pump. Material flows due to the emission of large amounts of gas caused, for example, by evaporating water can thereby be compensated for and suppressed in a simple manner. In accordance with the present invention, the pressures in the plasticizing and filtering sections are connected to the degassing and discharge section only via the flow channel, which assures a constant filling of the discharge screw and a constant degassing of the plastic. This also ensures that no dirt particles can be transported from the plasticizing section to the degassing section without having been passed through the melt filter.

To reduce the wear of the oppositely rotating feed screw flight connected to the plasticizing section caused by uncleaned, plasticized plastic entering the feed screw flight, it is advantageous to connect the flow channel on the outlet side of the melt filter via at least one return channel, which preferably includes a check valve, to the oppositely operating feed screw flight of the extruder screw at the feeding side of the device. A deliberate, small backflow of clean plastic through the feed screw flight to the plasticizing section makes certain that no uncleaned plastic enters the oppositely operating feed screw flight. The check valve reliably prevents a flow of unfiltered plastic to the filtered side, especially during the startup phase of the device.

To improve the degassing effect, a preferably threadless degassing space is provided between the oppositely operating screw flight of the extruder screw and the other screw flight operating in the same direction, which is defined by the extruder screw and/or the housing. Gases entering this area through the degassing opening are simply discharged from the device via the oppositely operating feed screw flight and the one operating in the same direction which reliably assures the desired pressure decoupling.

To avoid a flow of plastic material through the oppositely operating feed screw flight towards the other feed screw flight that operates in the same direction due to a very low viscosity of the molten plastic, wear of the oppositely operating feed screw flight or the like, it is recommended to provide a further, oppositely operating feed screw flight section, preferably with smaller thread height, between the degassing space and the feed screw flight that operates in the same direction.

To improve the flow impermeability of the feed screw flight operating in the same direction, the extruder screw can be provided with a damming element in the vicinity of the opening of the flow channel at the discharge side of the screw. This damming element can be, for example, a ring element, a reduced pitch on the feed screw and/or an enlarged screw core diameter relative to the degassing section. The counterpressure of the plastic product against the feed screw flight operating in the same direction is thereby increased.

BRIEF DESCRIPTION OF THE DRAWING

The drawing shows in cross-section a practical example of a device incorporating the present invention.

WAY TO EXECUTE THE INVENTION

A device for the extrusion of thermoplastic synthetic products includes an extruder transport screw 2 mounted in a housing 1. The screw has a plasticizing section P on its feed side and a degassing section E arranged in front of a discharge section A. Between the plasticizing section P and the degassing section E is an oppositely threaded and therefore oppositely operating feed screw flight 3 that is bridged over by a flow channel 5 housing a melt filter 4. To prevent a direct flow of gases formed in the plasticizing section to the degassing section, extruder screw 2 has another feed screw flight 7 that operates in the same direction as the screw and is located between oppositely operating feed screw flight 3 and an opening 6 of the flow channel 5 into the degassing section (E). In the transitional area between the oppositely operating feed screw flight 3 and the feed screw flight 7 operating in the same direction there is a degassing opening 8 through which gases and contaminants entering the feed screw flight area can be advantageously discharged from the device 1 so that a decoupling of pressure is assured.

Plastic to be processed is fed to device 1 via a filling opening 9. Extruder screw 2 melts the plastic in the plasticizing section P, and the molten plastic then passes along flow channel 5 and through melt filter 4. It is degassed in degassing section P. Degassing openings 10 connected to a vacuum pump 11 can optionally be provided in this area. When needed, a vacuum pump can be provided for degassing opening 8. Following the degassing process, the plastic is discharged from device 1 via discharge section A and can optionally be fed to a casting mold, a granulation head or the like. The two feed screw flights 3, 7 prevent plastic entering the area of the flight screws from the plasticizing section as well as from the degassing section.

The outlet side of the melt filter 4 in communication with flow channel 5 is connected via a return channel 12 with a check valve 13 to the oppositely operating feed screw flight 3 of extruder screw 2. As a result, a small amount of already cleaned plastic is deliberately returned to the plasticizing section during operation of the device to prevent contaminated, wear-promoting plastic from entering the area where feed screw flight 3 is located. For improved degassing, a threadless degassing space 14 is provided between the oppositely operating feed screw flight and the one operating in the same direction of the extruder screw 2. An additional, oppositely operating feed screw flight section 15 with a relatively smaller thread height is arranged between degassing space 14 and the feed screw flight 7 that operates in the same direction to reliably prevent a flow of plastic from the plasticizing side to the degassing side. The extruder screw 2 has a damming element 16 in the vicinity of the opening of the flow channel 5 on the outlet side in the form of a damming ring that increases the gas tightness of the feed screw flight 7 that operates in the same direction.

What is claimed is:

1. A device for extruding thermoplastic synthetic products comprising a housing mounting an extruder screw, the screw including a plasticizing section on its feed side, a degassing section positioned arranged upstream of a discharge section of the screw and an oppositely operating feed screw flight between the plasticizing section and the degassing section, at least one flow channel including a melt filter and bridging over the oppositely operating feed screw flight, characterized in that the extruder screw (2) includes a further feed screw flight (7) operating in the same direction and arranged between the oppositely operating feed screw flight (3) and an opening (6) of the flow channel (5) at the discharge section of the screw, and at least one degassing opening (8) in the housing (1) in a transitional area between the oppositely operating feed screw flight (3) and the further feed screw flight (7) operating in the same direction.

2. A device according to claim 1, characterized by at least one return channel (12) that preferably includes a check valve (13), and wherein the return channel extends from the flow channel (5) at an outlet side of the melt filter (4) to the oppositely operating feed screw flight (3) of the extruder screw.

3. A device according to claim 1, characterized by a threadless degassing space (14) arranged between the oppositely operating feed screw flight (3) and the feed screw flight (7) operating in the same direction of the extruder screw (2).

4. A device according to claim 3, characterized by a further oppositely operating feed screw flight section (15), preferably having smaller thread height, arranged between the degassing space (14) and the feed screw flight operating in the same direction.

5. A device according to claim 1, characterized in that the extruder screw (2) includes a damming element (16) arranged in a vicinity of an opening of the flow channel (5) to a discharge section of the screw.

* * * * *